United States Patent
Kim (10) Patent No.: US 7,085,339 B2
(45) Date of Patent: Aug. 1, 2006

(54) DATA RECOVERY DEVICE

(75) Inventor: Chul-Jin Kim, Yongin-shi (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 798 days.

(21) Appl. No.: 10/091,059

(22) Filed: Mar. 5, 2002

(65) Prior Publication Data

US 2002/0122517 A1 Sep. 5, 2002

(30) Foreign Application Priority Data

Mar. 5, 2001 (KR) .............................. 2001-11132

(51) Int. Cl.
*H04L 7/00* (2006.01)
(52) U.S. Cl. .................... 375/368; 375/326; 375/373; 370/513; 370/395.62; 714/775; 714/798
(58) Field of Classification Search ................ 375/368, 375/293, 287, 326, 235, 373; 348/537; 714/775, 714/798; 370/395.62, 513
See application file for complete search history.

(56) References Cited

U.S. PATENT DOCUMENTS

| | | | | |
|---|---|---|---|---|
| 5,204,879 A | * | 4/1993 | McConnell | 375/293 |
| 5,521,941 A | * | 5/1996 | Wiatrowski et al. | 375/287 |
| 5,859,671 A | * | 1/1999 | Kim | 348/537 |
| 6,134,276 A | * | 10/2000 | Aman et al. | 375/326 |
| 6,504,838 B1 | * | 1/2003 | Kwan | 370/352 |

* cited by examiner

*Primary Examiner*—Stephen Chin
*Assistant Examiner*—Ted M. Wang
(74) *Attorney, Agent, or Firm*—F. Chau & Associates, LLC (57) ABSTRACT

A data recovery device for precisely recovering a transmission signal even if the signal having phase variations is provided. The device comprises a demodulator for demodulating a transmission signal, a plurality of symbol recovery units, each generating a corresponding synchronous signal and a lock signal, wherein the lock signals are selectively enabled to select one of the synchronous signals, based on pattern variations of the transmission signal detected by the symbol recovery units, and a data decision unit for performing a data recovery operation using the selected synchronous signal to recover original data of the transmission signal.

13 Claims, 7 Drawing Sheets

(Prior Art)

(Prior Art)

(Prior Art)

$\{(-a)+(-b)\} - \{c+d\} \ll 0: \text{"1"}$

Fig. 3E (Prior Art)

$\{a'\} - \{(-b')+(-c')+(-d')\} \gg 0: \text{"0"}$

Fig. 4

Fig. 5

DATA RECOVERY DEVICE

CROSS-REFERENCE TO RELATED APPLICATION

This application claims priority to Korean Patent Application No. 2001-11132, filed on Mar. 5, 2001.

BACKGROUND

1. Technical Field

The present invention relates to data recovery devices, and more particularly, to a data recovery device for recovering transmitted data by tracing timings of a transmission signal and detecting symbols on data streams of the signal in a forward control channel of a mobile telephone system.

2. Description of Related Art

In an advanced mobile telephone system (AMPS), which is an analogue cellular mobile telephone system, the processes of set-up and hand-over (or hand-off) speech paths (or traffic channels) are performed through data transmission/reception between a base station and a mobile station (or a terminal). For example, an analogue cellular telephone system sets up a speech path by commands from a base station and responses from a mobile station.

The AMPS protocol comprises transmitting control data from a base station to a mobile station (or terminal) through a forward control channel (FOCC or paging channel). The control data is converted into binary digital data using an NRZ (Non-Return-to-Zero) pattern. The binary digital data is converted into digital data streams encoded in a Manchester format, thereby being synchronized with timing clocks (or bit clocks), before being RF—transmitted through an air space (or a free space).

Figure 1:
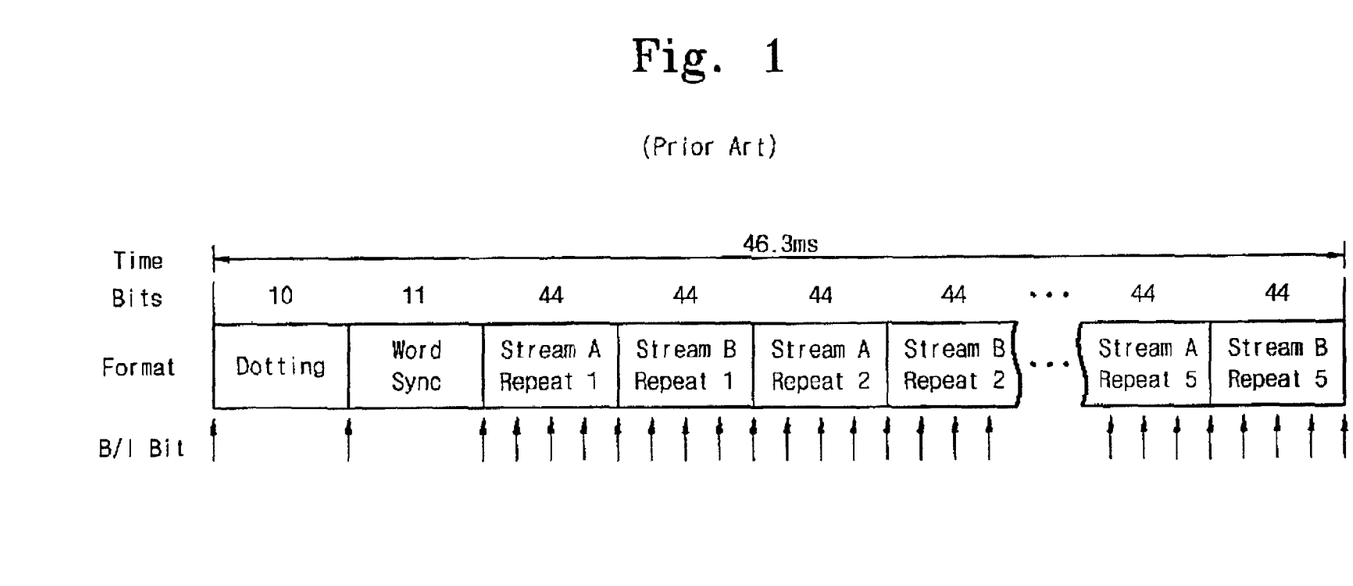
FIG. 1 is a diagram illustrating a structure of a NRZ data stream on a FOCC of AMPS.

FIG. 1 shows a structure of an NRZ (Non-Return-to-Zero) data stream on a FOCC. An NRZ data stream comprises a 10-bit dotting portion, a 11-bit synchronizing portion, and a plurality of blocks of 44-bit data in a predetermined series. The series of 44-bit data blocks has two data types for service systems A and B, and the 44-bit data blocks for A and B service systems are alternatively provided to the data stream five times. The data stream further comprises busy/idle bits supplied thereto by ten bits.

Figure 2:
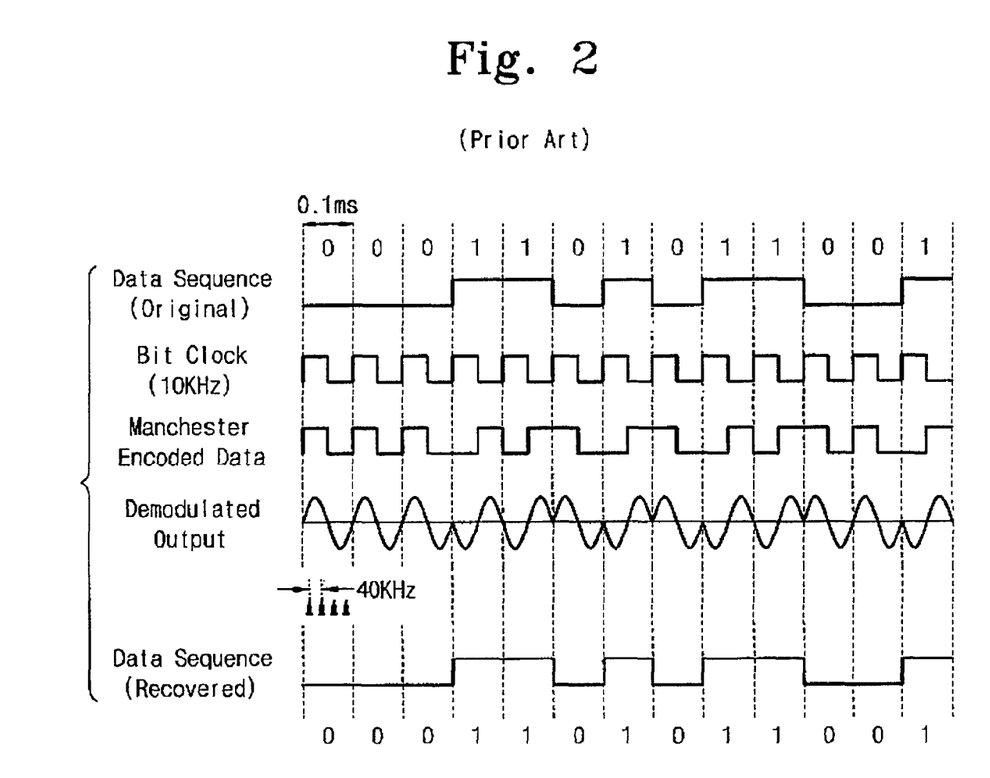
FIG. 2 is a timing diagram illustrating a conventional method for transmission/recovery of a NRZ data stream.

FIG. 2 is a timing diagram that illustrates signal waveforms for the transmission/recovery of a signal on a FOCC or paging channel. Referring to FIG. 2, a base station encodes an original signal having the NRZ data stream into a Manchester format, synchronously in response to a bit clock of 10 KHz. The Manchester-encoded signal is modulated to form a carrier wave signal, and the modulated signal is transmitted to a mobile station through air. The mobile station demodulates the carrier wave signal, and converts the demodulated signal into the original signal having the NRZ data steam by timing and tracing the demodulated signal based on a sampling period, for example, 40 KHz. The conversion from the demodulated signal to the NRZ data stream typically utilizes sampling operations with four level points a, b, c, and d, all of which are the same absolute value within one cycle period of the synchronous signal (a=b=c=d).

Figure 3A:
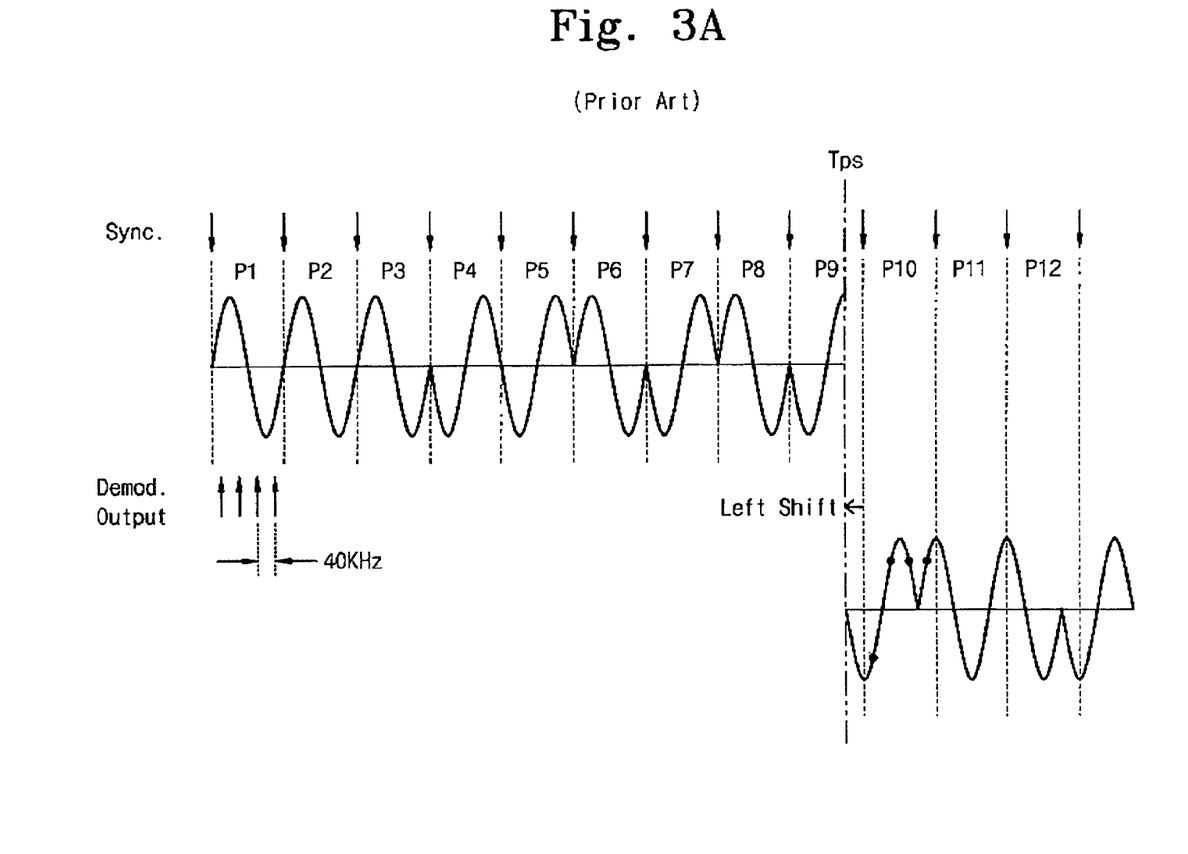
FIGS. 3A through 3E are diagrams showing waveforms for recovering data from a demodulated signal according to a conventional data recovery device and method.
Figure 3B:
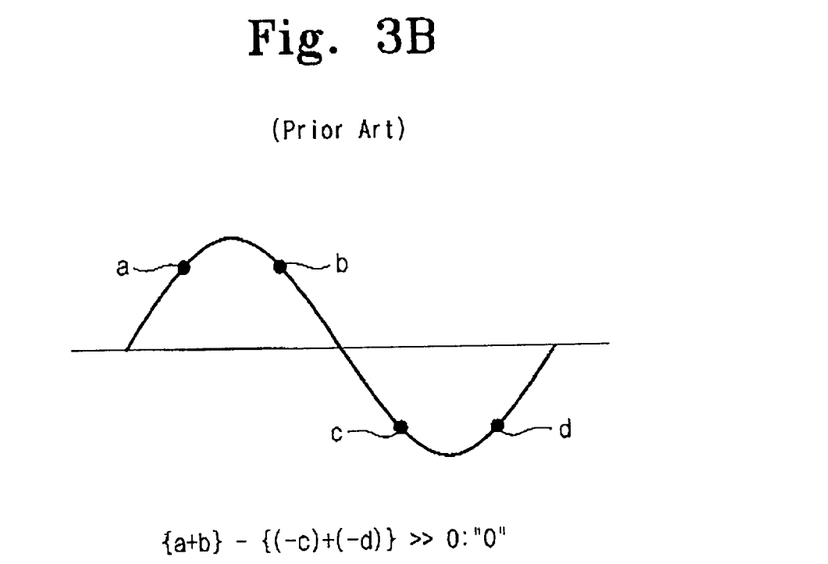
Figure 3C:
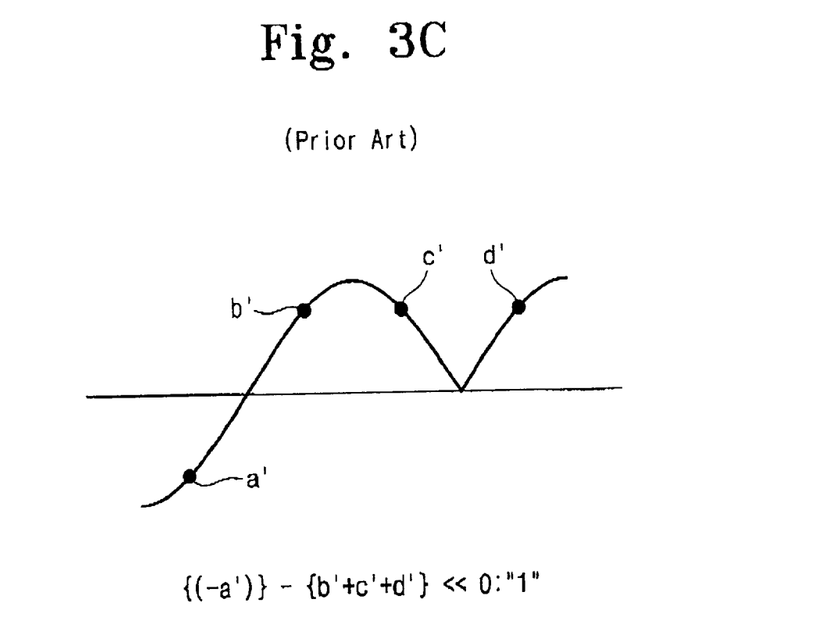
Figure 3D:
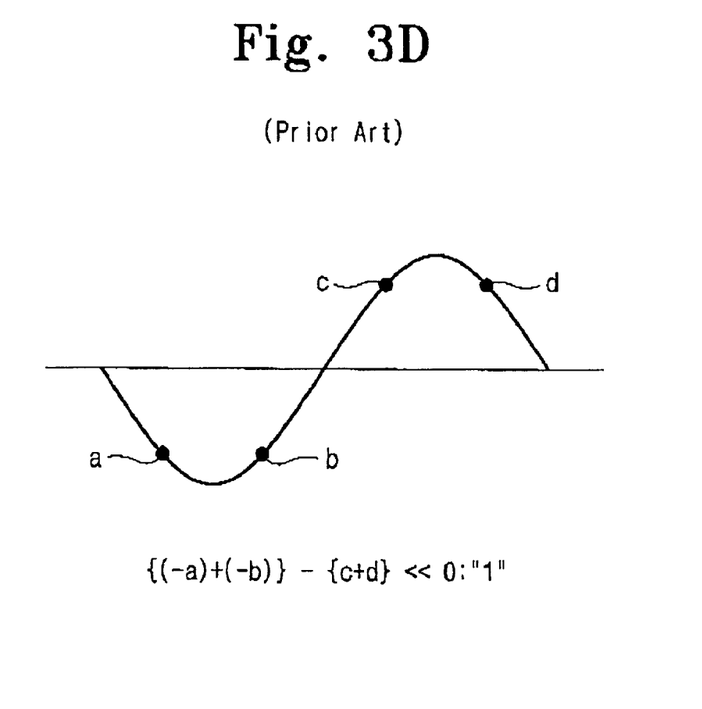

FIG. 3A shows waveforms of a synchronous signal (Sync) of a demodulated signal to be recovered according to a conventional data recovery protocol. FIGS. 3B–3E show synchronous signals of the demodulated signal illustrating a soft decision for recovering data. As shown in FIG. 3B, when the demodulated signal transitions from a positive domain to a negative domain, a bit of NRZ data corresponding to the signal is set to "0" (logically low in binary) if a summation result of the level point values is positive (>>0). As shown in FIG. 3D, when the demodulated signal transitions from the negative domain to the positive domain, a bit of the NRZ data corresponding to the signal is set to "1" (logically high in binary) if a summation result of the level point values is negative (<<0).

However, a conventional data recovery protocol may cause an error in tracing and sampling the demodulated signal using a synchronous signal, if the demodulated signal has a phase shift (e.g., to left) at a certain time, Tps, such as shown in FIG. 3A during the signal transmission through the air interface.

Figure 3E:
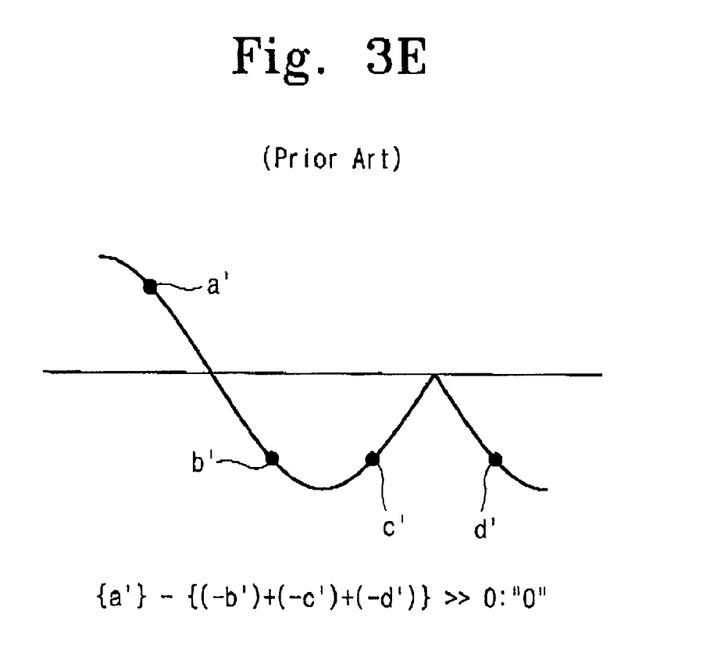

Assume that the demodulated signal is sampled by 40 KHz in every cycle period of the synchronous signal (Sync). If the phase shift of the demodulated signal occurs at cycle period P9 (in FIG. 3A), the synchronous signal at cycle period P9 may have abnormal level points a', b', c', and d', as shown in FIGS. 3C and 3E. In FIG. 3C, a summation value of the level points, i.e., {(−a')}−{b'+c'+d'}, results in a negative value, and thus the bit of the NRZ data corresponding to cycle period P9 is erroneously set to "1". In FIG. 3E, the summation value of the level points, i.e., {a'}−{(−b')+(−c')+(−d')} results a positive value, and thus the bit of the NRZ data corresponding to cycle period P9 is erroneously set to "0".

The abnormal sampling of the demodulated signal using the synchronous signal typically occurs due to fading effects that disaccord synchronization states of the demodulated signal. Thus, the data recovery process at a communication system is not only an important factor in evaluating the performance of data processing in the system, but also an important factor in affecting an error bit rate (BER) thereof. Thus, a need exists for a data recovery device that can precisely and efficiently trace synchronization timings of a demodulated signal during an idle state to improve a data processing performance in an AMPS, for example.

SUMMARY OF THE INVENTION

It is an object of the present invention to provide a data recovery device and method for efficiently tracing synchronization timings of a demodulated signal in a communication device.

According to one aspect of the present invention, a data recovery device comprises a demodulator for demodulating a transmission signal, a plurality of symbol recovery units, each generating a corresponding synchronous signal and a lock signal, wherein the lock signals are selectively enabled to select one of the synchronous signals, based on pattern variations of the transmission signal detected by the symbol recovery units, and a data decision unit for performing a data recovery operation using the selected synchronous signal to recover original data of the transmission signal.

In another aspect of the present invention, the device further comprises a level controller for limiting a voltage range of the demodulated signal to a predetermined voltage range. The data decision unit performs the data recovery operation by sampling the demodulated signal using a predetermined frequency within each cycle of a selected one of the synchronous signals.

According to another aspect of the present invention, a data recovery device for a mobile communications system comprises a demodulator for demodulating a transmission signal, a level controller for controlling voltage levels of the demodulated signal, a plurality of symbol recovery units, each generating a synchronous signal and a lock signal, a data recovery unit for performing a data recovery operation using a selected one of the synchronous signals, and a lock switch for selecting one of the synchronous signal, in response to the activation of a corresponding lock signal.

According to another aspect of the present invention, a method for recovering data in a communications system comprises the steps of demodulating a transmission signal, tracking signal patterns of the demodulated signal to generate a plurality of synchronous signals, selecting one of the synchronous signals based on a detected phase variation of the demodulated signal, and recovering data from the demodulated signal using the selected synchronous signal.

According to further aspect of the present invention, a program storage device readable by a machine, tangibly embodying a program of instructions executable by the machine to perform method steps for recovering data in a communications system is provided. The method steps comprise the steps of demodulating a transmission signal, tracking signal patterns of the demodulated signal to generate a plurality of corresponding synchronous signals and lock signals, selectively activating the lock signals based on a detected phase variation of the demodulated signal to selected one of the synchronous signals, and recovering data from the demodulated signal using the selected synchronous signal.

These and other aspects, embodiments, and advantages of the present invention will be better understood from the following detailed description of preferred embodiments in conjunction with the accompanying drawings.

DETAILED DESCRIPTION OF PREFERRED EMBODIMENTS

In the following description, for purposes of explanation, specific numbers, materials and configurations are set forth in order to provide a thorough understanding of the present invention. However, it will be apparent to one of ordinary skill in the art that the present invention may be practiced without specific details. In other instances, well-known systems are shown in diagrammatic or block diagram form in order not to obscure the present invention.

Figure 4:
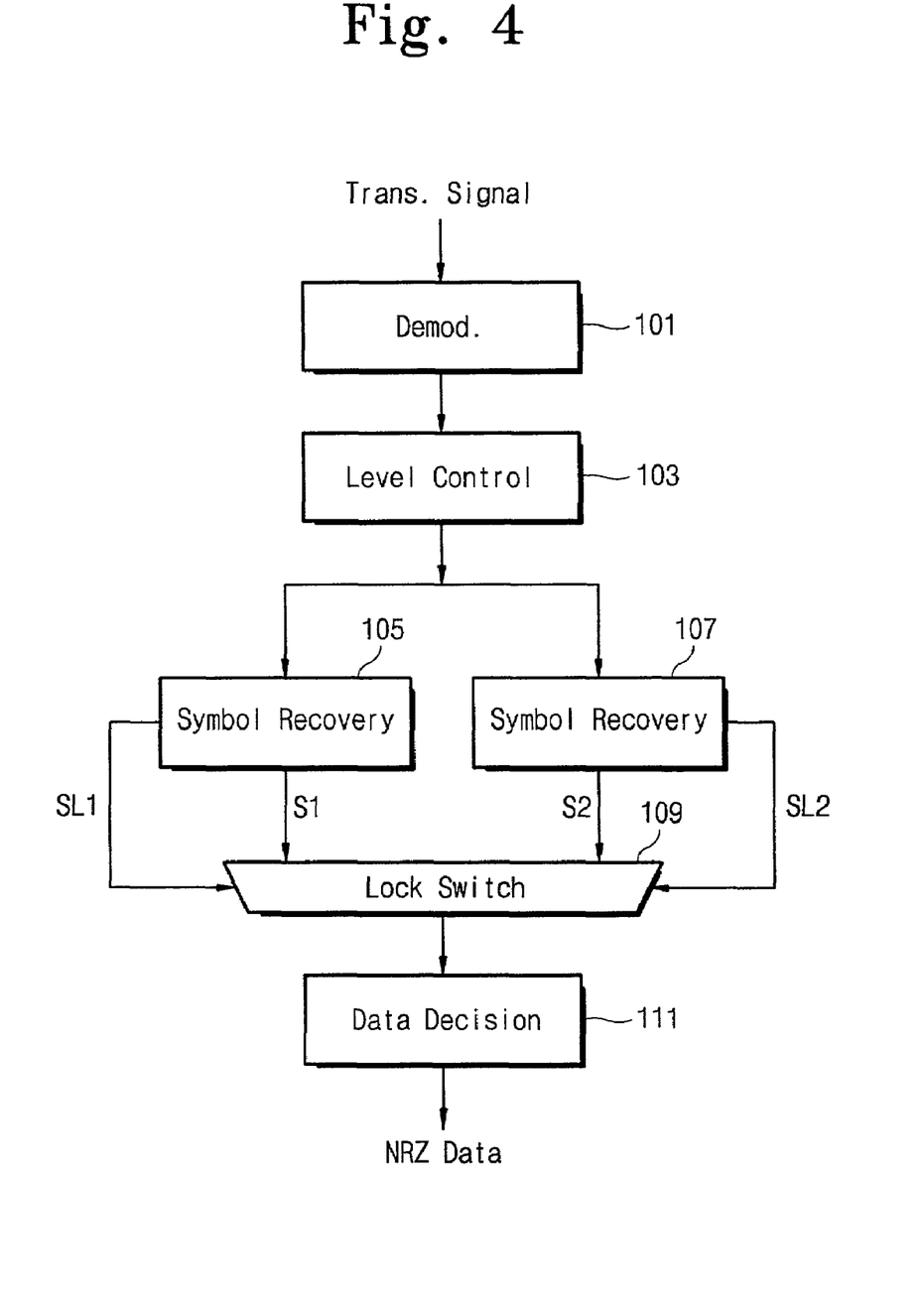
FIG. 4 is a block diagram of a data recovery device according to an embodiment of the present invention.

FIG. 4 is a block diagram of a data recovery device according to an embodiment of the present invention. The data recovery device may be incorporated in a communication system such as a mobile station. The data recovery device comprises a demodulator 101, a level controller 103, a pair of symbol recovery units 105 and 107, a lock switch 109, and a data decision unit 111.

The demodulator 101 receives and converts a transmission signal into a demodulated signal having a base band. The transmission signal is formed by encoding original data having an NRZ data stream structure in a Manchester pattern.

The level controller 103 establishes voltage levels from the demodulated signal to prepare for the sampling and symbol detection operations, excluding an intermediate voltage range from the sampling range including the level points a, b, c, and d based on the sampling frequency 40 KHz.

The symbol recovery units 105 and 107 detect signal patterns output from the level controller 103, and then generate symbol synchronous signals (S1 and S2), respectively. The symbol synchronous signals (S1 and S2) are alternatively applied to the data decision unit 111 through the lock switch 109 in response to synchronous lock signals (SL1 and SL2), respectively. The symbol synchronous signal (S1) is used in recovering original data in response to the lock signal (SL1), while the symbol synchronous signal (S2) is used in recovering the original data in response to the lock signal (SL2).

The data decision unit 111 generates NRZ data stream (that is subsequently recovered to the original data) preferably using the soft decision process as shown in FIGS. 3B and 3D.

Figure 5:
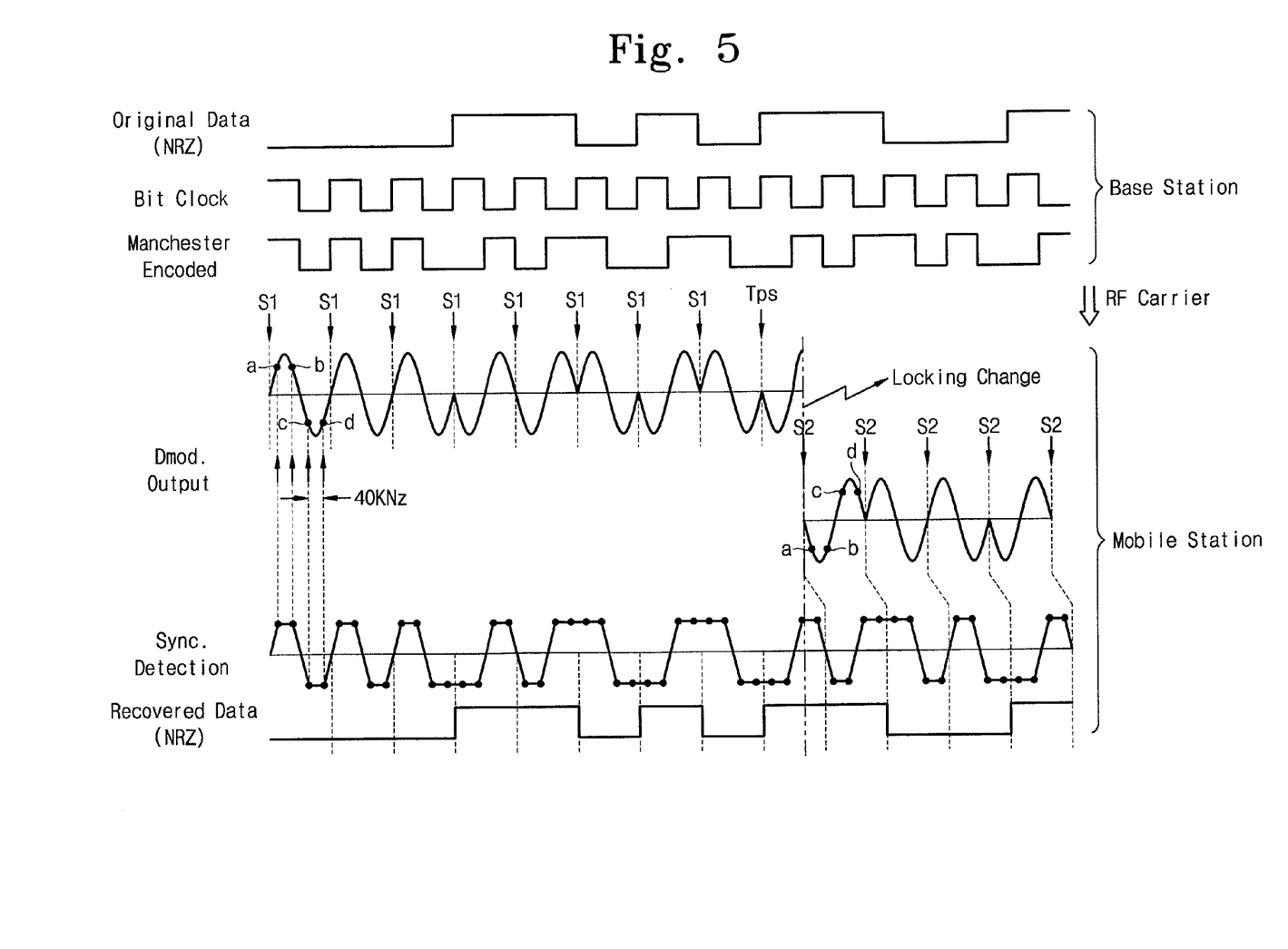
FIG. 5 is a timing diagram illustrating a method for recovering data according to an embodiment of the present invention.

FIG. 5 is a timing diagram illustrating a data recovery method according to an embodiment of the invention. As described above, original data comprising an NRZ data stream format encoded in Manchester format is transmitted from a base station to a mobile station by means of a RF carrier wave signal.

As shown in FIG. 5, the demodulated signal output from the demodulator 101 has an abnormal phase variation (shifted to left) by a certain time, Tps, due to fading effects or conditions at the base station, for example. The level controller 103 truncates the demodulated signal from the demodulator 101 to establish voltage levels for sampling and symbol detection of the signal. The level controller 103 further excludes an intermediate voltage range that is unnecessary to define the pattern of the demodulated signal.

One of the symbol recovery units, e.g., the first symbol recovery unit 105, checks signal patterns of the demodulated signal and generates a symbol synchronous signal (S1). The data decision unit 111 performs a data recovery operation using the symbol synchronous signal (S1) in response to the lock signal (SL1). The data recovery operation is preferably performed using the soft decision process (as shown in FIGS. 3B and 3D) with the level points a~d, based on a sampling frequency, for example, 40 KHz.

When a phase variation (e.g., left shift) occurs on the demodulated signal, the lock signal (SL1) is disabled and another lock signal (SL2) is enabled. That is, at the time Tps when the phase variation occurs, the locking status of the demodulated signal is changed from the symbol synchronous signal (S1) to the symbol synchronous signal (S2). In response to the changing of the locking status, the decision unit 111 performs a data recovery operation using the symbol synchronous signal (S2) and the soft decision process. The abnormal phase variation will occur gradually instead of abruptly as shown in FIG. 5 (or FIG. 3A).

The switching of the data recovery operation between the symbol synchronous signals (S1 and S2) occurs whenever a phase variation occurs on the demodulated signal. The sampling frequency (i.e., 40 KHz) and the level points may be modified to obtain more precise sampling and detection. Further, the number of the symbol synchronous signals may be modified as described to achieve more precise sampling and detecting of the demodulated signal. After completing the data recovery operations, the data decision unit 111 generates the NRZ data stream in accordance with a bit clock, preferably having a period of 0.1 ms.

Advantageously, a data recovery device according to an embodiment of the present invention improves a reliability of a data recovery operation even if a transmission signal has phase variations due to fading or other environment effects. Further, the switching of the data recovery operation of the invention can reduce bit error rate (BER) of the transmission signal in various environments of wireless communication system, particularly in FOCC of an AMPS.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A data recovery device, comprising:
   a demodulator for demodulating a transmission signal;
   a level controller for limiting a voltaae range of the demodulated signal to a predetermined voltage range, wherein the level controller excludes voltages levels outside a voltage range that includes sampling points of the synchronous signals, the sampling points being used in recovering the original data;
   a plurality of symbol recovery units, each detecting a signal from the level controller and generating a corresponding synchronous signal and a lock signal, wherein the lock signals are selectively enabled to select one of the synchronous signals, based on pattern variations of the transmission signal detected by the symbol recovery units; and
   a data decision unit for performing a data recovery operation using the selected synchronous signal to recover original data of the transmission signal.

2. The data recovery device of claim 1, wherein the data decision unit performs a data recovery operation by sampling the demodulated signal using a predetermined sampling frequency within each cycle of a selected one of the synchronous signals.

3. The data recovery device of claim 2, wherein the predetermined sampling frequency is 40 KHz.

4. The data recovery device of claim 1, wherein the transmission signal is generated by encoding the original data in Manchester format.

5. The data recovery device of claim 4, wherein the original data comprises an NRZ (Non-Return-to-Zero) data stream.

6. A data recovery device for a mobile communications system, comprising:
   a demodulator for demodulating a transmission signal;
   a level controller for controlling voltage levels of the demodulated signal, wherein the level controller excludes voltages levels outside a voltage range that includes sampling points of the synchronous signals, the sampling points being used in recovering the original data;
   a plurality of symbol recovery units, each detecting a signal from the level controller and generating a synchronous signal and a lock signal;
   a data recovery unit for performing a data recovery operation using a selected one of the synchronous signals; and
   a lock switch for selecting one of the synchronous signal, in response to the activation of a corresponding lock signal.

7. The data recovery device of claim 6, wherein the data recovery unit performs a data recovery operation by sampling the demodulated signal at a predetermined frequency within each cycle of the selected synchronous signal.

8. The data recovery device of claim 6, wherein the symbol recovery units activate the corresponding lock signal based on a detected pattern variation of the demodulated signal.

9. A method for recovering data in a communications system, comprising the steps of:
   demodulating a transmission signal;
   limiting a voltage range of the demodulated signal to a predetermined voltage range using a level controller, wherein the level controller excludes voltage levels outside a voltage range that includes sampling points of the synchronous signals, the sampling points being used in recovering the original data;
   tracking signal patterns of the demodulated signal to generate a plurality of synchronous signals;
   selecting one of the synchronous signals based on a detected phase variation of the demodulated signal from the level control; and
   recovering data from the demodulated signal using the selected synchronous signal.

10. The method of claim 9, wherein the step of selecting one of the synchronous signal, comprises activating a lock signal associated with a selected synchronous signal.

11. A program storage device readable by a machine, tangibly embodying a program of instructions executable by the machine to preform method steps for recovering data in a communications system, the method steps comprising:
   demodulating a transmission signal;
   limiting a voltage range of the demodulated signal to a predetermined voltage range using a level controller, wherein the level controller excludes voltage levels outside a voltage range that includes sampling points of the synchronous signals, the sampling points being used in recovering the original data;
   tracking signal patterns of the demodulated signal to generate a plurality of corresponding synchronous signals and lock signals;
   selectively activating the lock signal based on a detected phase variation of the demodulated signal from the level controller to select one of the synchronous signals; and
   recovering data from the demodulated signal using the selected synchronous signal.

12. The program storage device of claim 11, wherein the step of selectively activating the lock signal, comprises activating the lock signal associated with a selected synchronous signal.

13. The program storage device of claim 11, wherein the step of recovering data, comprises sampling the demodulated signal based on a predetermined frequency within each cycle of a selected one of the synchronous signals.

* * * * *